United States Patent [19]

Mack

[11] Patent Number: 4,589,781

[45] Date of Patent: May 20, 1986

[54] PORTABLE HEAT FLUXMETER FIXTURES

[75] Inventor: Russel T. Mack, Lake Jackson, Tex.

[73] Assignee: The Dow Chemical Company, Midland, Mich.

[21] Appl. No.: 705,754

[22] Filed: Feb. 25, 1985

[51] Int. Cl.<sup>4</sup> ...................... G01K 17/08; G01K 17/20
[52] U.S. Cl. ........................................ 374/29; 374/30; 374/208; 136/221; 136/230
[58] Field of Search ...................... 374/10, 12, 13, 29, 374/30, 43, 208, 210; 136/229, 230, 221, 235

[56] References Cited

U.S. PATENT DOCUMENTS

| | | | |
|---|---|---|---|
| 1,528,383 | 3/1925 | Schmidt | 374/30 |
| 1,942,519 | 1/1934 | Packard | 136/221 |
| 1,977,340 | 10/1934 | King | 374/30 |
| 2,022,515 | 11/1935 | Orchard | 136/230 |
| 3,228,241 | 1/1966 | Hullinger | 73/862.42 |
| 3,282,107 | 11/1966 | Ekstrom | 136/232 |
| 3,296,857 | 1/1967 | Kaczeus | 73/159 |
| 3,385,105 | 5/1968 | Smith | 73/159 |
| 3,573,995 | 4/1971 | Senbokuya | 136/221 |
| 4,265,117 | 5/1981 | Thoma et al. | 136/221 |
| 4,470,297 | 9/1984 | Ruhl | 73/159 |

FOREIGN PATENT DOCUMENTS 0304556 1/1929 United Kingdom ................ 136/221

Primary Examiner—Charles Frankfort
Assistant Examiner—Thomas B. Will
Attorney, Agent, or Firm—M. W. Barrow

[57] ABSTRACT

In the preferred and illustrated embodiment, multiple fixtures are set forth which function as support structures for thermal fluxmeters. A fluxmeter wafer or pad having top and lower faces and forming an output signal by means of thermopiles connected to both faces is used. It is supported by first and second alternate forms of fixtures. A force is applied to the fluxmeter wafer which is approximately normalized in both fixtures. This establishes a stabilized contact force against a surface to measure heat loss through the surface. This avoids variations in surface contact.

18 Claims, 7 Drawing Figures

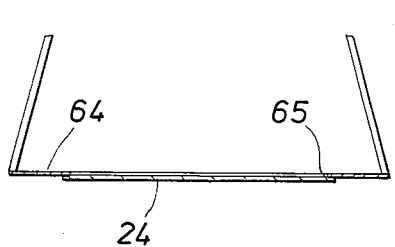
FIG.7
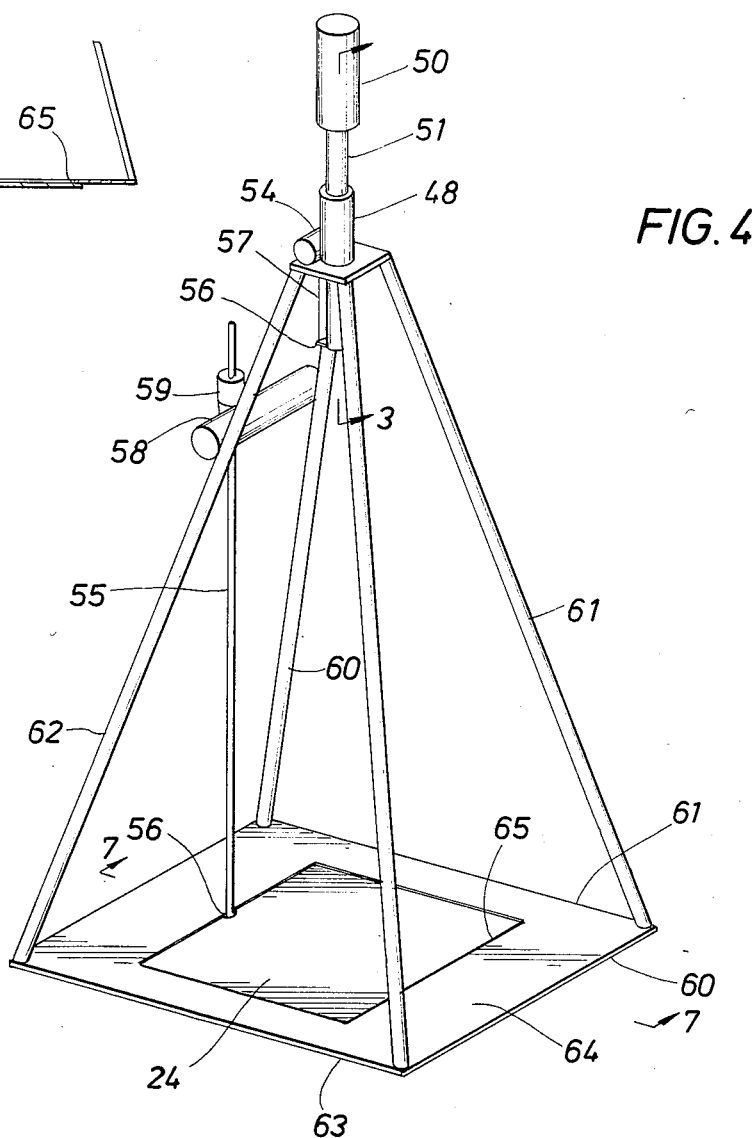
FIG.4
FIG.5
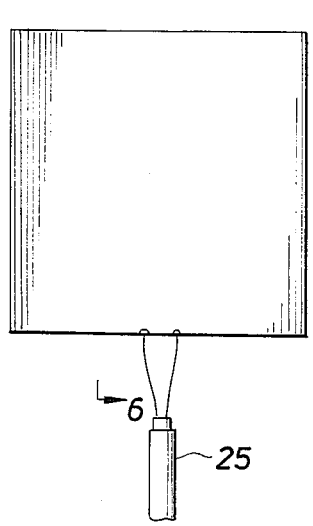
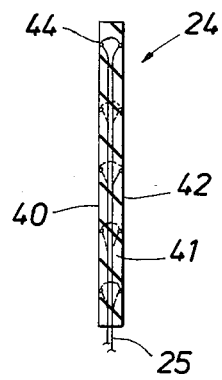
FIG.6

PORTABLE HEAT FLUXMETER FIXTURES

BACKGROUND OF THE DISCLOSURE

This disclosure is directed to a thermal fluxmeter and particular mounting fixtures therefor. In determining the heat loss of certain structures, it is helpful to measure the heat flux from a specified point. To the degree that a measuring device is placed on the surface, it interferes, at least in theory, with the heat loss. That is, the measuring device itself may well function as an insulator and reduce the flux which is assayed in the measurement. On the other hand, it is necessary to contact a thermal fluxmeter against a surface area for obtaining the measurement. The degree and consistency of contact between the flux measuring device and the surface undergoing measurement may create error in the measurements. Accordingly, relatively brief but intimate and consistent contact between the sensitive area of the fluxmeter and the object undergoing tests helps immensely in obtaining quality data.

One mode of assisting this contact is to apply paste or heat conductive grease to an area before positioning a thermal fluxmeter against that area. As an aid to this, applying the thermal fluxmeter against the surface with a firm force helps get more consistent data. The heat flow is consistently "sampled". A firm force is helpful in the sense that there is more intimate surface contact between the test instrument and the surface of interest. This either reduces or eliminates the microvoids at the interface (under the fluxmeter) to obtain a more accurate representation of the metered surface. While one might state (in theory) that maximum force yields maximum accuracy, there is a point of diminishing return with increasing force.

This device enables a reasonable and steady force to be applied. The force is sufficiently high to minimize interspacial thermal resistance errors. This increases the repeatability of the apparatus by assuring that approximately the same force is applied on each use of the device. Moreover, it enables the device to be applied and removed (about one minute dwell time) so that distortion of the thermal flux by the test instrument is reduced. In the application of a thermal fluxmeter to a specified area, an initial transient stabilizes on heat saturation of the thin fluxmeter to enable a "settled" reading.

The present apparatus enables a thermal fluxmeter to be applied to a surface. The present apparatus includes a mounting fixture. In fact, alternate mounting fixtures are illustrated, thereby providing one device which can be used on flat surfaces and another device which finds suitable application on curved surfaces. The latter can be used on the sides of storage tanks, pressure vessels, pipe and the like.

This device applies a thermal fluxmeter to a surface with a force which is more or less stablilized. In this light, repetitive measurements can be implemented, thereby assuring reasonably accurate, repeatable data.

With the foregoing in view, the apparatus is briefly summarized as a hand held portable fixture with a handle suitable to be grasped. Further, the device includes a constant force spring which resists the application of the device so that loading is approximately consistant and substantially uniform from use to use. The apparatus thus enables the thermal fluxmeter to be held against the surface. Output data is obtained from the thermopiles in the thermal fluxmeter.

BRIEF DESCRIPTION OF THE DRAWINGS

So that the manner in which the above recited features, advantages and objects of the present invention are attained and can be understood in detail, a more particular description of the invention briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

FIG. 4 is an alternate form fixture wherein the fluxmeter is fixably mounted on a rectangular support;

FIG. 5 is a plan view of a fluxmeter plate which is in the form of a large wafer;

FIG. 6 is a sectional view along the line 6—6 of FIG. 5 (which is exaggerated in thickness) to show details of construction of a thermopiles measuring device; and FIG. 7 is a fragmentary sectional view of the structure of FIG. 4 showing the relationship of the fluxmeter to its support plate.

DETAILED DESCRIPTION OF THE PREFERRED EMBODIMENT

Figure 1:
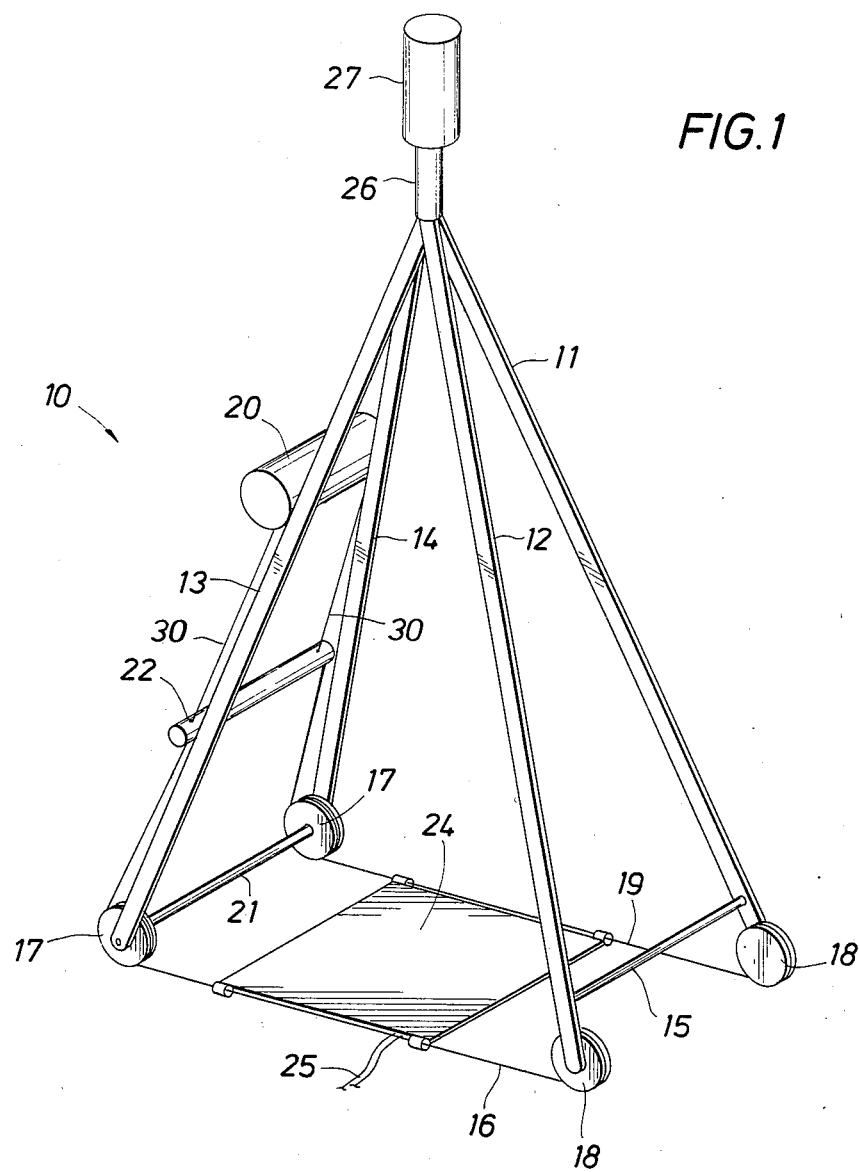
FIG. 1 is a perspective view of a flexible fluxmeter deployed on a pair of parallel cables and supported by a fixture having a handle enabling hand use for thermal measurement.

In FIG. 1 of the drawings, the numeral 10 identifies a hand held flux instrument. It is formed of four diverging legs 11, 12, 13, and 14. For a typical hand held version, the legs can range between ten and fifteen inches in length. The legs 11 and 12 terminate at a transverse frame member 15. This fixes the spacing of the legs and makes the structure rigid. The various legs and crossbraces define a small rigid frame to enable the legs 12 and 13 to support a flexible cable 16. The cable 16 is anchored at one end on a fixed roller 18 and spools around a roller wheel 17 to define a taut cable portion. The roller wheel 17 is supported on the leg 13. The cable 16 thus partially loops around the sheave to extend upwardly to a draw bar 22 below a spring tension mechanism 20. In like fashion, a similar parallel cable 19 operates in the same fashion and loops upwardly around a similar roller wheel and is connected to the draw bar 22 to be pulled in the same fashion. The spring tension mechanism will be described in detail hereinafter.

The cables thus have a width or spacing which is approximately equal along the cables. The legs 13 and 14 are made rigid by a transverse frame member 21. The frame member 21 cooperates to fix the spacing of the legs, thereby assuring that the two cables are parallel, in a common plane, and are thus able to support the fluxmeter. The fluxmeter is identified by the numeral 24. It is a planar member formed of flexible material to be described in FIG. 5. Briefly, it is a rectangular member and is adapted to be facially contacted against a curved surface. The typical variety of curved surfaces includes pipe, drums, and pressure vessels. Typically, it is contacted against a portion of a cylinder. If it is contacted against a sphere of relatively large radius, it will lie sufficiently flat against the surface to obtain good contact over the surface area. It can be used in measuring thermal flux from most curved surfaces including those having a radius of about two inches and greater.

The fluxmeter 24 provides an output (usually a millivolt output) on a pair of conductors 25. They are connected with suitable amplifiers and recording apparatus to record a signal representative of the flux.

The four legs terminate by joining to a single post 26 connected with a handle 27. A fixed handle can be used with the embodiment 10. Precise accuracy is not required; it is helpful, however, to have a force which, from use to use, does not vary significantly, and hence such a system is incorporated as will be described. It can be incorporated by controlling the tension on the cables. Alternatively, it can be incorporated by controlling the force applied through the handle 27. To this end, one such force regulating mechanism is needed, and typically two are not needed. Therefore, it is either located in the spring tension mechanism 20 which controls the tension on the cables, or alternatively, it is located in the handle 27 which controls the force applied when the fixture is hand held. For this reason, both have been shown in FIG. 1, but it is noted that typically only one need be included in a device. Even so, both will be described in detail.

Figure 2:
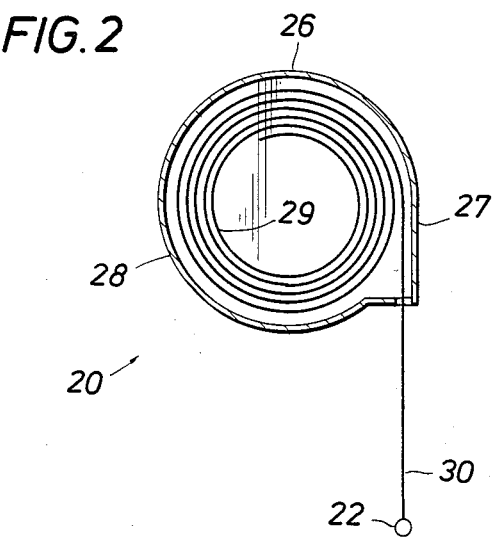
FIG. 2 is a sectional view through a coil spring mechanism adapted to spool cable while positioning the thermal fluxmeter against a curved surface, as for example, a pipe or drum.

Attention is next directed to FIG. 2 of the drawings for details of construction of the coil spring mechanism 20. This device applies a relatively constant force to the mounting cable 16 and 19. In FIG. 2, the mechanism includes a housing 26 of any suitable configuration having a flat wall 27 easily mounted against a pair of legs. The wall 27 connects to a housing wall 28 which defines an internal chamber. The housing has finite depth to enable two similar springs 29 to be placed in the chamber. Each spring is made of an elongate band of spring material, a band coiled, so to speak, into a coil of several turns. The coiled band resembles a clock spring in its coiled shape; the band is pulled at one end of the coil where the end 30 connects to the draw bar 22. A slot 31 enables the end 30 to connect with the draw bar 22 to apply a relatively constant force to the cables. As an example, assume the coil spring has eight turns and the end 30 protrudes only slightly from the slot 31. Pulling the end 30 uncoils part of the coil by a turn or fraction thereof. The extension of the coil end is accompanied by a retractive force of substantially fixed magnitude; that is, the force is fairly constant.

Coil springs typically develop transverse forces due to canting as well as tractive forces normal to the centerline about which the spring is wound. The coil springs 29 are therefore oriented such that transverse spring forces will balance and thus spring force on the draw bar 22 will have only a tractive component substantially normal to the draw bar. Spring force will thus be evenly distributed to the draw bar and to cables 16 and 19. For symmetry and transverse force balance, the coils are duplicated to apply a relatively even, uncanted force to the cable system. Thus, the coils might have spacing therebetween of two or three inches to enable extension of up to four inches travel in a typically sized model. Coil extension and retraction occurs smoothly so the cables are enabled to "wrap around" a curving surface as will be described.

The fluxmeter 24 is a flexible member. Its construction is shown in FIG. 5. There, the fluxmeter is shown to have a top face with a parallel opposing bottom face. The conductors 25 are connected to the device. It is more readily understood on viewing FIG. 6. This shows a bottom face 40. There is a central core portion 41. There is also a top face 42. The fluxmeter 24 is sheet like, and is resilient to enable flexing or bending. Thus, the faces 40 and 42 are connected with a suitable thermocouple arrangement at 44. This requires the use of appropriate thermocouple metals. Preferably, many thermocouples are located at various locations in the sheet like array and constitute an array of thermocouples. They are connected with the conductors 25 emerging from the edge of the wafer.

The core material 41 is preferably thin. If it is too thick and a high quality insulator, it will actually serve as an insulator when positioned against a hot surface. It is relatively thin to thereby permit heat to flow through the material. Heat flow through the material thus changes the temperature of the two surfaces 40 and 42. The device is relatively small so that it does not distort heat flux in an excessively large area. Because the quantity of the material shown in FIG. 5 is relatively small, stabilization for obtaining data occurs relatively quickly, usually one minute or so. That is, assume that the device is quite cool and applied to a surface which is 150° C. In that instance, about one minute will enable the face 40 to stabilize in temperature.

The wafer shown in FIG. 5 is attached by sewn fabric loops or sleeves at edges to the cables 16 and 19. Since it is a flexible sheet-like member, it is able to flex with the cables. Thus, when it is held against a curved surface, as, for instance, against a pipe or drum, the cable 16 is pulled taut against the curved surface. In like fashion, the wafer will bend and accommodate this shape also. This may require some of the cable to be extended. Recall that the cable is anchored while one end at the other end connects to constant force springs which "unwind". The curved surface is accommodated. So to speak, the device is positioned with all four legs contacted against the surface of relatively large diameter. If the device is held against pipe, the four legs are preferably positioned straddling the pipe so that the cable can curve more or less in a semicircle and thereby position the fluxmeter 24 in intimate contact against the pipe, inscribing an arc of curvature equal in length to the width of the fluxmeter 24.

Recall that the holding force of the fluxmeter 24 is approximately constant. That is, if the cable 16 has an approximately fixed or constant tension, the fluxmeter 24 is held with approximately equal compressive force against the side of the container, pipe or other curving surface. To this end, the arrangement shown in FIG. 2 is desirable to sustain an approximately uniform opposing force. That is, the loading on the fluxmeter is approximately constant. Variations of perhaps two or three percent do not particularly impair the data so long as adequate contact is made and reasonable consistency from use to use with any suitable range of error or deviation.

Figure 3:
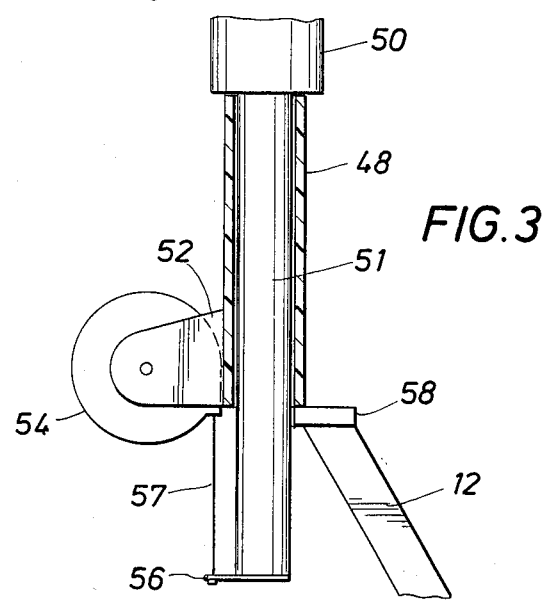
FIG. 3 is a sectional view along the line of 3—3 of FIG. 4 showing details of handle construction.

Attention is now directed to FIG. 3 of the drawings which shows a handle. This handle can be used with the structure of FIG. 4 as will be described. FIG. 3 disclosed an upstanding fixed sleeve 48. A hand grip or handle 50 is also included. It joins to an extendable push rod 51 which pushes through the sleeve 48. The sleeve supports a mounting tab 52. The mounting tab extends to the side and anchors a housing 54 enclosing a constant force spring within the housing 54.

The shaft 51 has a protruding tab 56. As the shaft 51 is forced downwardly in FIG. 3 and the tab 56 is carried with it, it pulls out the end of the flat spring 57. The spring 57 extends into the housing 54 (through a slot) to coil in multiple turns. The spring 57 in the housing 54 is pulled and hence resists uncoiling or extension. When the coil is pulled, a resistant force is observed in the handle. As the spring is pulled out, it creates a force which is approximately fixed for a stroke of a few inches. Alternatively, the constant force urging means in the housing 54 may conveniently take the form of a gauge, load cell or any other suitable device permitting controlled force application of a fluxmeter, thermocouple or both to a surface being measured.

The fixed sleeve 48 is supported on a frame member 58 which connects with the several legs of the fixture in similar manner to that shown in FIG. 1.

Attention is more specifically directed to FIG. 4 of the drawings. There, the handle 50 is again shown moving the shaft 51, all relative to the sleeve 48. The embodiment of FIG. 4 includes the same four legs. There are four rigid leg supported members 60, 61, 62 and 63. They support a transverse thin metal plate 64 having a central opening 65, shown in the drawing as being rectangular configuration but capable of other form as well. The peripheral edges of the fluxmeter are glued or otherwise secured to the lower edges of the opening 65 in plate 64. The plate 64 can be relatively thin, perhaps in the range of about 1/32 inches. This enables the face of the fluxmeter wafer 25 to be positioned and held against a flat surface such that only the fluxmeter wafer is in contact with the surface being measured. The surface contact of the fluxmeter wafer is made with an approximately fixed, perpendicular loading applied to the fixture by the handle thereby assuring repeatability from application to application.

The embodiments shown in FIG. 1 and FIG. 4 differ in that FIG. 4 is intended primarily for a flat surface while FIG. 1 is best used on a curving surface. Even at that, in light of the relative small scale of the hand held measuring instrument shown in this disclosure, the fixed supportive fixture of FIG. 4 can be used in measuring heat loss from large tanks which often have a diameter of one hundred feet. As will be understood, the curvature when measuring a surface area of perhaps ten inches square is nil on such a large tank. Likewise, the design of FIG. 1 can be used on perfectly flat surfaces, with some small loss of accuracy probable.

The fixture shown in FIG. 4 includes an optionally installed thermocouple for measuring surface temperature. It includes an elongate encased thermocouple assembly 55, which is commercially available and includes a temperature measuring thermocouple at the tip extending through a hole 56 in the mounting plate 64. The thermocouple assembly 55 is telescoped through a mounting sleeve 59 to slide against the force of a coil spring resisting upward pushing. A constant force "clock spring" is satisfactory as a coil spring for this activity but almost any kind of spring would be effective for such purpose. The thermocouple assembly 55 extends a fraction of an inch below the plate 64 to cause upward loading on the rod, assuring contact with the surface to measure surface temperature. The spring force must be high enough for reliable contact, but lower than that of the constant force spring controlling the fluxmeter load.

This apparatus is a hand held fixture for a fluxmeter which applies an approximately calibrated and sustained force against the surface. That is, from use to use, the hand held equipment is applied with an approximately fixed perpendicular loading force. This is true of both embodiments; the force is preferably fixed within a range of about a few percent to assure consistency in use.

The constant force described above enables the fluxmeter 24 to maintain the approximately consistent quality of contact with the surface at which the measurements are being undertaken. For this reason, data obtained from a multitude of data points is reasonably consistent. That is, it is taken under reasonably consistent conditions. In a typical routine, the fluxmeter is applied at a specified location for a fixed interval. For instance, the interval might be one minute. It is desirable that the interval be sufficiently long that the face of the fluxmeter has time to come up to temperature. Moreover, with the application of a relatively fixed loading force, the reliability of the data so obtained is much higher. The device is relatively light weight, enabling an operator to obtain many data points during the work day whereby a large heat loss survey can be quickly conducted.

While the constant force urging means exemplified in FIGS. 2-3 may comprise constant force springs such as clock type coil springs, such is not intended to limit the present invention. The constant force urging means 51 and 54 may comprise load cells, gauges or other means to ensure measuring force repeatability.

While the foregoing is directed to the preferred embodiment the, scope is determined by the claims which follow.

What is claimed is:

1. Apparatus for measuring heat flux from a surface, comprising:
    (a) a support fixture having leg means;
    (b) planar fluxmeter means supported by said fixture and having a face thereon adapted to be contacted against a surface to measure heat flux therefrom;
    (c) handle means connected to said fixture for enabling hand held operation thereof by a user;
    (d) means for controlling an engagement force urging said fluxmeter means toward said surface, said means providing in repeatable fashion an approximately constant said engagement force to said fluxmeter means such that contact of the face thereof against the surface is consistently loaded; and
    (e) mounting cables extending between said legs means wherein said mounting cables support said fluxmeter means, and further wherein said fluxmeter means and said cables are bendable to enable conformance against a curved surface on contact thereagainst.

2. The apparatus of claim 1 wherein said fixture includes four legs and said fluxmeter means is a planar member supported by said legs on said cables.

3. The apparatus of claim 2 wherein said legs terminate at four ends located at a common plane, and including frame members connecting to said legs to fix said leg ends in a rigid rectangle in the common plane; and said legs support said fluxmeter means on said cables at the common plane.

4. The apparatus of claim 3 including a hand held handle connected with a shaft, said shaft extending through mounting sleeve means to enable the user to apply a loading force through said handle and said shaft;

and said handle and said sleeve means are connected by resilient means providing a fixed opposition force to said handle.

5. The apparatus of claim 1 including an elongated thermocouple assembly supported by said support fixture, said thermocouple assembly extending through mounting sleeve means to enable the user to apply a loading force through said handle to said thermocouple assembly.

6. The apparatus of claim 1 wherein said leg means connects to said force controlling means.

7. The apparatus of claim 1 wherein said force controlling means connects to said mounting cables to control tension thereof.

8. The apparatus of claim 7 wherein said force controlling means extends said cables against said approximately constant force.

9. The apparatus of claim 8 wherein resilient means rotates and extends said cables under substantially fixed load.

10. The apparatus of claim 1, wherein:
(a) said leg means support a plate member on said cables;
(b) said planar fluxmeter means is secured to the lower surface of said plate member.

11. The apparatus of claim 10, wherein:
(a) said plate member defines an opening of slightly smaller dimension than said planer fluxmeter means; and
(b) said planar fluxmeter means is peripherally secured to the lower surface of said plate member and exposed within said opening of said plate member.

12. The apparatus of claim 10, including:
(a) elongate thermocouple means being movably supported by said support fixture with the lower end thereof normally extending below the lower surface of said planar fluxmeter means; and
(b) means urging said elongate thermocouple means with a substantially constant force to said normally extending position thereof and yielding upon contact with the surface being measured to permit substantially constant force contact of said planar fluxmeter means and said thermocouple means with the surface being measured.

13. Apparatus for measuring heat flux from a surface, comprising:
(a) a support fixture having leg means;
(b) planar fluxmeter means supported by said fixture and having a face thereon adapted to be contacted against a surface to measure heat flux therefrom;
(c) handle means connected to said fixture for enabling hand held operation thereof by a user;
(d) means for controlling an engagement force urging said fluxmeter means toward said surface, said means providing in repeatable fashion an approximately constant said engagement force to said fluxmeter means such that contact of the face thereof against the surface is consistently loaded;
(e) said leg means support a plate member;
(f) said planer fluxmeter means being secured to the lower surface of said plate member;
(g) said plate member defines an opening of slightly smaller dimension than said planar fluxmeter means; and
(h) said planar fluxmeter means is peripherally secured to the lower surface of said plate member and exposed within said opening of said plate member.

14. The apparatus of claim 13 wherein said fixture includes four legs and said fluxmeter means is a planer member supported by said legs.

15. The apparatus of claim 14 wherein said legs terminate at four ends located at a common plane and including frame members connecting to said legs to fix said leg ends in a rigid rectangle in the common plane; and said legs supporting said fluxmeter means in the common plane.

16. The apparatus of claim 13 including a hand held handle connected with a shaft, said shaft extending through mounting sleeve means to enable the user to apply a loading force through said handle and said shaft; and said handle and said sleeve means are connected by resilient means providing a fixed opposition force to said handle.

17. The apparatus of claim 13 wherein said leg means connects to said force controlling means.

18. The apparatus of claim 13 wherein said force controlling means connects to mounting cables to control tension thereof and said mounting cables support said planar flux meter means.

* * * * *

UNITED STATES PATENT AND TRADEMARK OFFICE
CERTIFICATE OF CORRECTION

PATENT NO. : 4,589,781
DATED : May 20, 1986
INVENTOR(S) : Russel T. Mack

It is certified that error appears in the above-identified patent and that said Letters Patent is hereby corrected as shown below:

Col. 1, line 59; reads "stablilized", should read --stabilized--.

Col. 1, line 66; reads "consistant", should read --consistent--.

Col. 3, line 34; reads "cable", should read --cables--.

Col. 4, line 65; reads "disclosed", should read --discloses--.

Col. 5,. line 32; reads "25", should read --24--.

Col. 6, line 28; insert --a mechanism-- after "such".

Signed and Sealed this

Seventeenth Day of February, 1987

Attest:

DONALD J. QUIGG

Attesting Officer

Commissioner of Patents and Trademarks